United States Patent
Park et al.

(10) Patent No.: US 10,224,121 B2
(45) Date of Patent: Mar. 5, 2019

(54) SEALING MECHANISM FOR A NUCLEAR REACTOR VESSEL CABLE PENETRATION TUBE

(71) Applicant: KEPCO ENGINEERING & CONSTRUCTION COMPANY, INC., Gyeongsangbuk-do (KR)

(72) Inventors: Hyun Woo Park, Daejeon (KR); Won Ho Lee, Gyeonggi-do (KR); Young Ju Kwon, Daejeon (KR); Myoung Goo Lee, Daegeon (KR); Sang Gyoon Chang, Sejong-si (KR); Dae Hee Lee, Daejeon (KR)

(73) Assignee: KEPCO ENGINEERING & CONSTRUCTION COMPANY, INC., Gyeongsangbuk-do (KR)

( * ) Notice: Subject to any disclaimer, the term of this patent is extended or adjusted under 35 U.S.C. 154(b) by 130 days.

(21) Appl. No.: 15/415,143

(22) Filed: Jan. 25, 2017

(65) Prior Publication Data

US 2017/0213607 A1   Jul. 27, 2017

(30) Foreign Application Priority Data

Jan. 25, 2016   (KR) .................. 10-2016-0008885

(51) Int. Cl.
*G21C 13/036*   (2006.01)
*G21C 17/116*   (2006.01)

(52) U.S. Cl.
CPC .......... *G21C 13/036* (2013.01); *G21C 17/116* (2013.01); *Y02E 30/40* (2013.01)

(58) Field of Classification Search
CPC ....................... G21C 13/036; G21C 17/116
(Continued)

(56) References Cited

U.S. PATENT DOCUMENTS 3,520,989 A * 7/1970 Funk ..................... G21C 17/116
                                                              376/203
4,420,456 A * 12/1983 Nickel ................. G21C 17/116
                                                              376/203

(Continued)

FOREIGN PATENT DOCUMENTS

JP          6-43286 A      2/1994
JP          6-35136 Y2     9/1995
(Continued)

OTHER PUBLICATIONS

Notice of Allowance dated Mar. 8, 2017 of the Korean Patent Application No. 10-2016-0008885.
(Continued)

*Primary Examiner* — Jack W Keith
*Assistant Examiner* — Daniel Wasil
(74) *Attorney, Agent, or Firm* — Nixon Peabody LLP; Jeffrey L. Costellia

(57) ABSTRACT

A sealing mechanism for a reactor vessel (RV) cable penetration tube improves the functional and structural integrity of a cable inserted in an RV through a penetration tube due to use of a precise thimble. The sealing mechanism includes a penetration tube configured to penetrate an RV from an outside to an inside thereof and having a penetration hole for communication with the inside of the RV, a cable configured to be inserted in the RV through the penetration hole of the penetration tube, and a thimble placed between the cable and the penetration tube, wherein a dimple groove portion is provided on the thimble in a direction from an outer surface of the penetration hole toward the cable.

5 Claims, 3 Drawing Sheets

(58) Field of Classification Search
USPC ............... 376/203, 205; 174/151, 152 R
See application file for complete search history.

(56) References Cited

U.S. PATENT DOCUMENTS

| | | | |
|---|---|---|---|
| 4,986,954 A * | 1/1991 | Feurgard | G21C 17/108 376/203 |
| 5,235,138 A * | 8/1993 | Shah | H02G 3/22 174/151 |
| 5,357,547 A | 10/1994 | Obermeyer et al. | |
| 2018/0190396 A1 * | 7/2018 | Brun | G21C 13/036 |

FOREIGN PATENT DOCUMENTS

| | | | |
|---|---|---|---|
| JP | 2010-226771 A | 10/2010 | |
| KR | 200267879 Y1 | 3/2002 | |

OTHER PUBLICATIONS

Office Action dated Sep. 20, 2016, in Korean Application No. 10-2016-0008885, 5 pages.

* cited by examiner

SEALING MECHANISM FOR A NUCLEAR REACTOR VESSEL CABLE PENETRATION TUBE

CROSS-REFERENCE TO RELATED APPLICATION

This application claims the benefit of Korean Patent Application No. 10-2016-0008885, filed on Jan. 25, 2016, in the Korean Intellectual Property Office, the disclosure of which is incorporated herein in its entirety by reference.

BACKGROUND

1. Field

One or more embodiments relate to a sealing mechanism for a small-medium reactor vessel (RV) cable penetration tube, and more particularly, to a sealing mechanism for a small-medium RV cable penetration tube, the sealing mechanism being configured to improve the functional and structural integrity of a cable inserted into a small-medium RV through a penetration tube by using a precise thimble.

2. Description of the Related Art

In general, control devices are installed in small and medium reactor vessels (RVs) to control nuclear reactors. Control cables for operating such control devices are inserted from the outside to the inside of RVs by using tubes penetrating the RVs, and sealing mechanisms are used to prevent leakage of cooling materials from nuclear reactors.

Control cables inserted into small and medium RVs are required to operate normally under high-temperature, high-pressure, high-radioactivity, subaqueous conditions and secure sealing mechanisms have to be used to prevent leakage of cooling materials from nuclear reactors along cables arranged in penetration tubes. Particularly, control cables through which power and various signals are provided to control rod driving devices installed in RVs are required to operate without replacement for a given period of time for safe operations of nuclear reactors.

Although such control cables are required to have functional and structural integrity under high-temperature, high-pressure, high-radioactivity, subaqueous conditions, the current technology for improving the integrity of cables is insufficient.

FIG. 1 is a view illustrating a cable 30 inserted in an RV 10 through a penetration tube 20 in the related art. Referring to FIG. 1, since a device or structure for supporting the cable 30 is not provided in the related art, the cable 30 may wobble due to fluid flows or various internal vibrations occurring in the RV 10. Therefore, the structural integrity of the cable 30 may deteriorate.

Fluid flows and various internal vibrations occurring in the RV 10 may damage the cable 30 in addition to lowering the structural integrity of the cable 30. Thus, the cable 30 may not function normally and the functional integrity of the cable 30 may deteriorate.

SUMMARY

One or more embodiments include a sealing mechanism for a small-medium reactor vessel (RV) cable penetration tube, the sealing mechanism being configured to improve the functional and structural integrity of a cable inserted into a small-medium RV through a penetration tube by using a precise thimble.

Additional aspects will be set forth in part in the description which follows and, in part, will be apparent from the description, or may be learned by practice of the presented embodiments.

According to one or more embodiments, there is provided a sealing mechanism for a small-medium RV cable penetration tube, the sealing mechanism including: a penetration tube configured to penetrate an RV from an outside to an inside thereof and including a penetration hole for communication with the inside of the RV; a cable configured to be inserted in the RV through the penetration hole of the penetration tube; and a thimble placed between the cable and the penetration tube, wherein a dimple groove portion is provided on the thimble in a direction from an outer surface of the penetration hole toward the cable.

The thimble may have a tube shape and may be placed between the cable and the penetration tube, the dimple groove portion may extend along an outer surface of the thimble, and an end of the dimple groove portion and another end of the dimple groove portion may make an angle of about 120° to about 180° with a center of the thimble. The dimple groove portion may have a round groove shape.

The sealing mechanism may further include a guide tube and a Swagelok fitting, wherein the guide tube may protrude from an end of the penetration tube and may include a guide hole communicating with the penetration hole to receive the cable, and the Swagelok fitting may be installed on the end of the penetration tube or an end of the guide tube.

The diameter of the penetration tube may be smaller at an end portion and another end portion of the penetration tube than at a middle portion of the penetration tube, and the thimble may be supported by the end portion and the other end portion of the penetration tube. The thimble may include a thimble protrusion between the end portion and the middle portion of the penetration tube or between the other end portion and the middle portion of the penetration tube.

The thimble may be shorter than the penetration hole such that an interval may be defined between the thimble and an end of the penetration tube or between the thimble and another end of the penetration tube.

The penetration tube may include at least one penetration hole, and the penetration tube may be provided in a lateral side of the RV.

BRIEF DESCRIPTION OF THE DRAWINGS

These and/or other aspects will become apparent and more readily appreciated from the following description of the example embodiments, taken in conjunction with the accompanying drawings in which.

DETAILED DESCRIPTION

Figure 1:
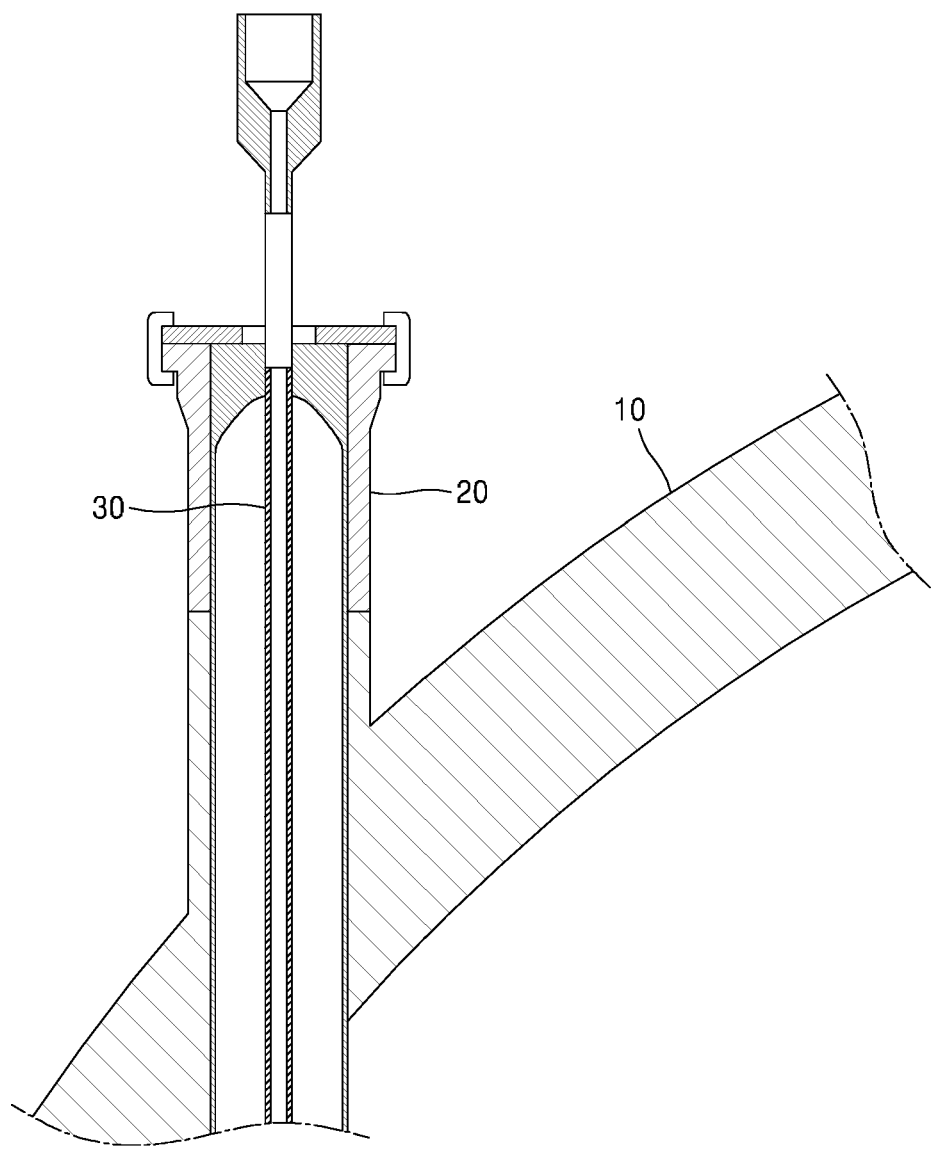
FIG. 1 is a view illustrating a sealing mechanism of the related art for a small-medium reactor vessel (RV) cable penetration tube.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the example embodiments are merely described below, by referring to the figures, to explain aspects of the present description. As used herein, the term "and/or" includes any and all combinations of one or more of the associated list.

The example embodiments relate to a sealing mechanism for a small-medium reactor vessel (RV) cable penetration tube configured to improve the functional and structural integrity of a cable inserted into a small-medium RV through a penetration tube due to use of a precise thimble. Hereinafter, the example embodiments will be described with reference to the accompanying drawings.

Figure 2:
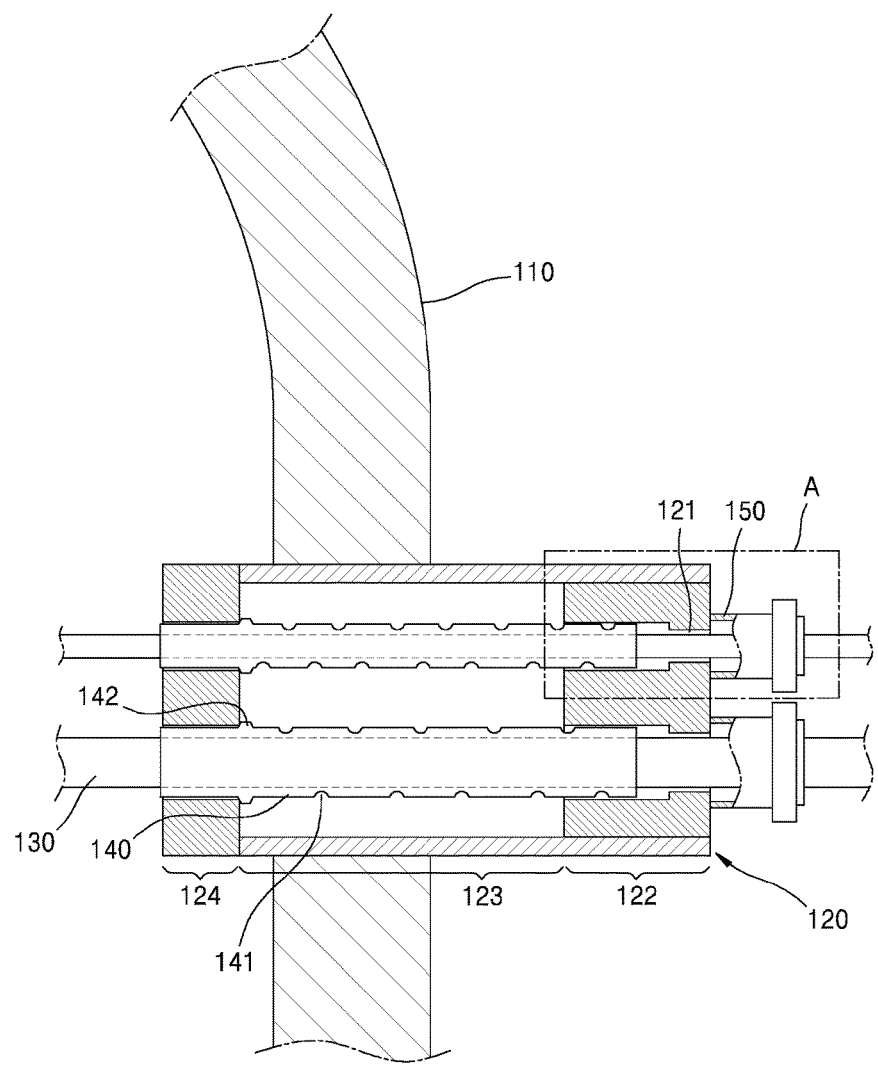
FIG. 2 is a schematic view illustrating a sealing mechanism for a small-medium RV cable penetration tube according to an example embodiment.

Referring to FIG. 2, according to an example embodiment, a sealing mechanism for a small-medium RV cable penetration tube includes a penetration tube 120, a cable 130 (two are shown), a thimble 140 (two are shown), and a dimple groove portion 141 (two or more are shown).

The penetration tube 120 penetrates an RV 110 from the outside to the inside thereof and includes a penetration hole 121 for communication with the inside of the RV 110. The penetration hole 121 extends from an end of the penetration tube 120 to another end of the penetration tube 120 and communicates with the inside of the RV 110.

The cable 130 may be introduced into the RV 110 by inserting the cable 130 into the penetration hole 121 of the penetration tube 120. The cable 130 may include various kinds of cables. Examples of the cable 130 may include a control cable connected to a controller placed in a small-medium RV and a cable connected to an in-reactor instrument configured to measure the neutron flux distribution and temperature of a reactor core of an RV. Besides the above-mentioned cables, examples of the cable 110 may include any kind cables insertable into the RV 110.

The thimble 140 is placed between the cable 130 and the penetration tube 120. The thimble 140 may have a thin tube shape and surround the cable 130. The thimble 140 may include a zircalloy. The thimble 140 may surround the cable 130 and may function as a structural support for the cable 130. The shape of the thimble 140 is not limited to a tube shape. The thimble 140 may have any shape as long as the thimble 140 functions as a structural support for the cable 130.

The dimple groove portion 141 includes a groove formed in a direction from an outer surface of the penetration hole 121 toward the cable 130. That is, the dimple groove portion 141 may have a groove shape recessed into the thimble 140 toward the cable 130. The dimple groove portion 141 may be in just contact with an outer surface of the cable 130. If the dimple groove portion 141 is in just contact with the cable 130, wobbling of the cable 130 may be prevented, and the structural integrity of the cable 130 may be improved (however, the dimple groove portion 141 may not be completely in just contact with the cable 130 but may be separate from the cable 130 by a slight distance).

The dimple groove portion 141 may extend in an outer surface of the thimble 140 having a tube shape, and an end and another end of the dimple groove portion 141 may make an angle of about 120° to about 180° with the center of the thimble 140. That is, the thimble 140 may have a circular cross-sectional shape, and the center of the thimble 140 may refer to the center of the circular cross-sectional shape. The dimple groove portion 141 may extend within an angle range of about 120° to about 180° along the outer surface of the thimble 140 having a 360° circular cross-sectional shape.

The dimple groove portion 141 may extend more than about 180°, or less than about 120°. However, if the dimple groove portion 141 extends more than about 180°, a contact area between the dimple groove portion 141 and the cable 130 may increase, and thus the magnitude of force acting on the cable 130 may increase. On the contrary, if the dimple groove portion 141 extends less than about 120°, the cable 130 may be poorly supported. Therefore, the end and the other end of the dimple groove portion 141 may make an angle of about 120° to about 180° with the center of the thimble 140.

Figure 3:
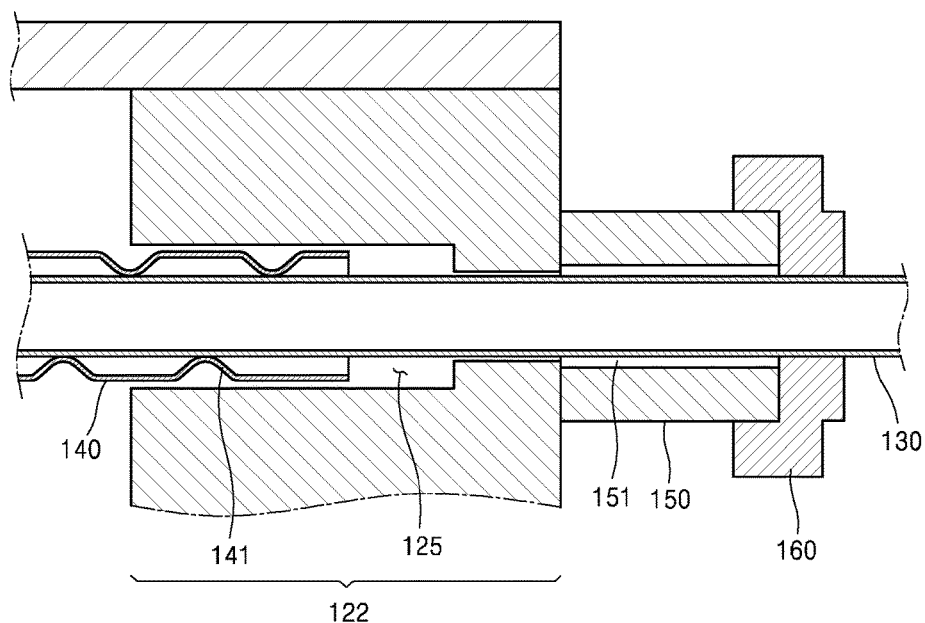
FIG. 3 is an enlarged view illustrating a portion of FIG. 2.

Referring to FIG. 3, a plurality of dimple groove portions 141 are formed in a length direction of the thimble 140. The dimple groove portions 141 may be formed at regular or irregular intervals in the length direction of the thimble 140. In addition, the dimple groove portions 141 may be formed in a side-to-side alternating manner in the length direction of the thimble 140. If the dimple groove portions 141 are densely formed in a particular region of the thimble 140, a large force may be applied to a particular position of the cable 130, and thus negative effects may arise.

The dimple groove portions 141 may have a round groove shape. The dimple groove portions 141 may be in contact with the cable 130. Therefore, if the dimple groove portions 141 have a sharp shape, the cable 130 may be damaged by the dimple groove portions 141. Thus, the dimple groove portions 141 may have a round shape. However, the shape of the dimple groove portions 141 is not limited a round shape. That is, the dimple groove portions 141 may have any shape as long as the dimple groove portions 141 support the cable 130 without damaging the cable 130.

In other words, the dimple groove portions 141 are not limited to the above-mentioned shape but may have various shapes. For example, the dimple groove portions 141 may not have a groove shape extending along the outer surface of the thimble 140 but may be formed in the shape of grooves not extending along the outer surface of the thimble 140. In addition, the dimple groove portions 141 may have any other shape capable of supporting the cable 130.

According to an embodiment, the penetration tube 120 of the sealing mechanism for a small-medium RV cable penetration tube may include a penetration tube end portion 122, a penetration tube middle portion 123, and another penetration tube end portion 124. The penetration tube end portion 122 may be located outside the RV 110, and the other penetration tube end portion 124 may be located inside the RV 110.

Referring to FIG. 2, the diameter of the penetration hole 121 may be smaller at the penetration tube end portion 122 and the other penetration tube end portion 124 than at the penetration tube middle portion 123. That is, the penetration tube end portion 122 and the other penetration tube end portion 124 may be narrower than the penetration tube middle portion 123.

At least one penetration hole 121 may be formed in the penetration tube 120. If a plurality of penetration holes 121 are formed in the penetration tube 120, a plurality of cables 130 may be inserted into the RV 110 through the penetration tube 120. When a plurality of penetration holes 121 are formed in the penetration tube 120, the plurality of penetration holes 121 may communicate with the penetration tube middle portion 123. That is, the plurality of penetration holes 121 may not communicate with each other in the penetration tube end portion 122 and the other penetration tube end portion 124 but may communicate with each other in the penetration tube middle portion 123.

The thimble 140 is placed around the cable 130 in the penetration hole 121 and may be inserted into and supported by the penetration tube end portion 122 and the other penetration tube end portion 124. Referring to FIG. 2, the diameter of the penetration hole 121 at the penetration tube end portion 122 and the other penetration tube end portion 124 may be equal to or slightly greater than the diameter of the thimble 140 having a tube shape.

Owing to this structure, an end of the thimble 140 may be inserted into the penetration tube end portion 122, and another end of the thimble 140 may be inserted into the other penetration tube end portion 124. Since the diameter of the penetration hole 121 at the penetration tube end portion 122 and the other penetration tube end portion 124 is equal to or slightly greater than the diameter of the thimble 140, the thimble 140 may be supported without wobbling by the penetration tube end portion 122 and the other penetration tube end portion 124. Thus, the thimble 140 may be supported without being shaken by fluid flows or other internal vibrations occurring in the RV 110. Since the thimble 140 is supported as described above, the cable 130 placed inside the thimble 140 may be supported without being shaken by fluid flows or other internal vibrations occurring in the RV 110, and thus the structural integrity of the cable 130 may be improved.

In addition, the diameter of the thimble 140 at the penetration tube end portion 122 and the other penetration tube end portion 124 is equal to or slightly greater than the diameter of the cable 130, and thus fine gaps may be formed between the cable 130 and the thimble 140. Such fine gaps may generate a pressure difference with respect to a fluid contained in the RV 110.

The thimble 140 inserted into the penetration tube end portion 122 and the other penetration tube end portion 124 may be shorter than the penetration hole 121, and thus there may be an interval between the thimble 140 and an end of the penetration tube 120 or another end of the penetration tube 120. The penetration hole 121 extends from the end of the penetration tube 120 to the other end of the penetration tube 120, and the thimble 140 is shorter than the penetration hole 121. Therefore, a thermal expansion space 125 may be formed between the thimble 140 and the end or the other end of the penetration tube 120.

Referring to FIG. 3, the thermal expansion space 125 may be formed in the penetration tube end portion 122 in a region defined from the end of the thimble 140 to the end of the penetration tube 120. Owing to the thermal expansion space 125, the thimble 140 may not be damaged during thermal expansion. If the thermal expansion space 125 is not formed, the thimble 140 may be damaged because there is no space for accommodating thermal expansion of the thimble 140. That is, since the thimble 140 is shorter than the penetration hole 121, the thermal expansion space 125 is formed, and thus the thimble 140 may not be damaged by heat as well as the cable 130 may be supported safely.

The position of the thermal expansion space 125 is not limited to the penetration tube end portion 122. For example, the thermal expansion space 125 may be formed in the other penetration tube end portion 124. In addition, any other space may be formed to prevent the thimble 140 from being damaged by thermal expansion.

Referring to FIG. 2, a dimple protrusion 142 may be provided on the thimble 140 between the penetration tube end portion 122 and the penetration tube middle portion 123 or between the other penetration tube end portion 124 and the penetration tube middle portion 123. The dimple protrusion 142 may prevent separation of the thimble 140 from the penetration tube 120. That is, the diameter of the thimble 140 in a boundary region between the other penetration tube end portion 124 and the penetration tube middle portion 123 is greater than the diameter of the penetration hole 121 in the other penetration tube end portion 124. Since the thimble 140 have a diameter greater than the diameter of the penetration hole 121 formed in the other penetration tube end portion 124 as described above, the thimble 140 may be caught on the other penetration tube end portion 124, and thus the thimble 140 may not be separated from the penetration tube 120.

As long as the dimple protrusion 142 prevents the thimble 140 from being separated from the penetration tube 120, the dimple protrusion 142 may be formed in a region between the penetration tube end portion 122 and the penetration tube middle portion 123 or in a region between the other penetration tube end portion 124 and the penetration tube middle portion 123. The dimple protrusion 142 may be continuously formed along the outer surface of the thimble 140 or may include one or more protrusions independently formed on the outer surface of the thimble 140. The dimple protrusion 142 is not limited to the above-described shape. The dimple protrusion 142 may have any shape as long as the dimple protrusion 142 prevents separation of the thimble 140 from the penetration tube 120.

A guide tube 150 may protrude from the end of the penetration tube 120, and a guide hole 151 may be formed in the guide tube 150 in communication with the penetration hole 121 to receive the cable 130. The guide tube 150 is provided to easily insert the cable 130 into the penetration tube 120. That is, the cable 130 may be inserted into the penetration tube 120 while being guided by the guide tube 150.

Figure 4:
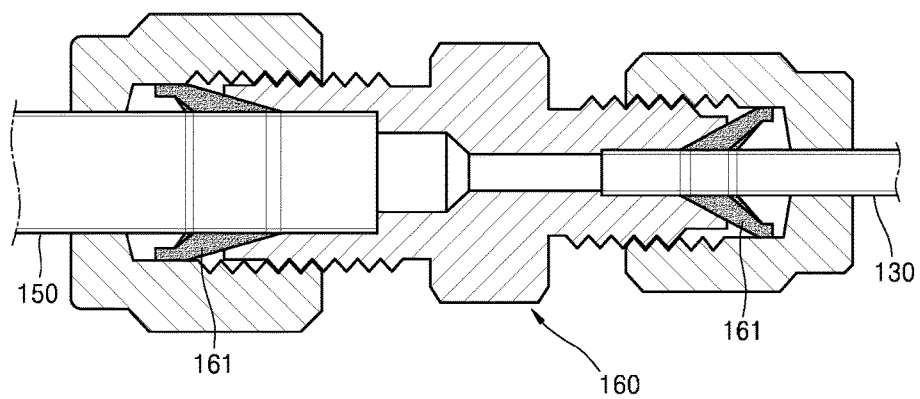
FIG. 4 is a schematic view illustrating a Swagelok fitting of the sealing mechanism for a small-medium RV cable penetration tube according to an example embodiment.

Referring to FIG. 4, a Swagelok fitting 160 may be coupled to the end of the penetration tube 120 so as to finally seal the penetration tube 120. The Swagelok fitting 160 is a sealing device configured to provide sealing by pushing front edges of ferrules 161 having a cone ring shape using wedge-shaped push rings. The Swagelok fitting 160 is a well-known device, and thus a detailed description thereof will not be presented here.

The Swagelok fitting 160 may be directly coupled to the end of the penetration tube 120, or after the guide tube 150 is provided on the end of the penetration tube 120, the Swagelok fitting 160 may be coupled to the guide tube 150.

The penetration tube 120 may be provided in a lateral side of the RV 110. Due to physical shape characteristics of the RV 110 related to relevant facilities such as a vapor generator connected to the RV 110, the penetration tube 120 for the cable 130 may be provided in a lateral side of the RV 110 rather than in an upper side of the RV 110 so as to improve the efficiency of subsequent processes. That is, many other structures may be installed on the upper side of the RV 110. Therefore, the penetration tube 120 may be installed in the lateral side of the RV 110 to avoid interference with other structures.

The sealing mechanism for a small-medium RV cable penetration tube may have the following effects.

Since small-medium nuclear reactors do not have sufficient space for structures supporting cables, sealing mechanisms configured to ensure the structural integrity of cables and at the same time to prevent leakage of cooling materials by means of penetration tube design have been required.

According to the sealing mechanism for a small-medium RV cable penetration tube of the embodiments, the thimble 140 having a precise structure is placed around the cable 130 inserted into the RV 110 through the penetration tube 120, thereby preventing the cable 130 from being shaken and damaged by fluid flows and other internal vibrations occurring in the RV 110.

Sealing mechanisms of the related art do not have devices for fixing cables. In general, power control cables used in nuclear reactors are relatively weak and vulnerable to fluid flows and other internal vibrations occurring in RVs.

However, according to the sealing mechanism for a small-medium RV cable penetration tube of the embodiments, wobbling of the cable 130 may be prevented by the thimble 140 and the dimple groove portions 141 formed on the thimble 140. The thimble 140 are placed around the cable 130 in the penetration hole 121 and supported by the penetration tube end portion 122 and the other penetration tube end portion 124, and thus wobbling of the cable 130 may be prevented. Since the dimple groove portions 141 are in contact with the cable 130, the cable 130 may also be supported by the dimple groove portions 141, thereby improving the structural integrity of the cable 130.

Since the structural integrity of the cable 130 is improved, the function of the cable 130 may not be damaged, and thus the functional integrity of the cable 130 may be improved.

Various cables may be inserted into RVs, and such cables are required to be used for a long time without replacement so as to prevent leakage of reactor cooling materials. According to the embodiments, since the sealing mechanism for a small-medium RV cable penetration tube is configured to protect the cable 130, the cable 130 may be used for a long time without replacement, and thus maintenance and repair work may be performed within a shorter time period.

In addition, owing to the simple structural design according to the embodiments, the cable 130 may be easily replaced with a new one. Thus, operators may work safely, and the modularity of facilities may be improved, thereby inducing the developing of relevant industries and increasing added value. In addition, when the cable 130 is repaired or replaced, the thimble 140 may function as a guide tube, and thus the repair or replacement of the cable 130 may be more easily performed.

Small and medium nuclear reactors using small and medium reactor vessels are free from various problems associated with large reactors, and it is possible to construct such small and medium nuclear reactors within a relatively short period of time to stably supply electricity to necessary places. Thus, there is worldwide interest in small and medium nuclear reactors. However, it is difficult to install additional structures in small and medium nuclear reactors to support cables because of structural limitations. Thus, the integrity of cables may be guaranteed only by the method of providing precise structures in penetration tubes. The sealing mechanism for a small-medium RV cable penetration tube of the embodiments realizes the precise structural method by providing the thimble 140 and the dimple groove portions 141 in the penetration tube 120. That is, the sealing mechanism for a small-medium RV cable penetration tube of the embodiments improves the structural and functional integrity of the cable 130 based on the precise structural method.

As described above, according to the one or more of the above embodiments, in the sealing mechanism for a small-medium RV cable penetration tube of the embodiments, the thimble 140 having a precise structure is placed on the cable 130 inserted into the RV 110 through the penetration tube 120, thereby preventing the cable 130 from being shaken and damaged by fluid flows and other internal vibrations occurring in the RV 110.

In addition, the sealing mechanism improves the functional and structural integrity of the cable 130, and since the sealing mechanism has a simple structure, a time period necessary for maintenance and repair may be decreased.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

What is claimed is:

1. A sealing mechanism for a nuclear reactor vessel cable penetration tube, the sealing mechanism comprising:
   a penetration tube
      configured to penetrate a nuclear reactor vessel from an outside to advance to an inside thereof and
      comprising an axially extending penetration hole for communication with the inside of the nuclear reactor vessel;
   a cable configured to be inserted to the inside of the nuclear reactor vessel through the penetration hole of the penetration tube; and
   a thimble placed between the cable and the penetration tube such that the thimble surrounds the cable within the penetration tube,
      the thimble comprising a dimple groove extending in a direction from an outer surface of the thimble toward the cable,
   wherein a diameter of the penetration hole at a first end portion of the penetration tube and a diameter of the penetration hole at a second end portion of the penetration tube are both smaller than a diameter of the penetration hole at a middle portion of the penetration tube,
   wherein the thimble is supported by the first end portion and the second end portion of the penetration tube,
   wherein the thimble is axially shorter than the penetration hole, wherein a thermal expansion space is defined between one or more of the thimble and the first end portion of the penetration tube or the thimble and the second end portion of the penetration tube, and
   wherein the penetration tube is provided in a lateral side of the nuclear reactor vessel.

2. The sealing mechanism of claim 1, wherein the dimple groove portion has a round groove shape.

3. The sealing mechanism of claim 1, further comprising a guide tube protruding from an end of the penetration tube, the guide tube comprising a guide hole communicating with the penetration hole to receive the cable.

4. The sealing mechanism of claim 1, further comprising a guide tube and a Swagelok fitting,
   wherein the guide tube protrudes from an end of the penetration tube and comprises a guide hole communicating with the penetration hole to receive the cable, and
   the Swagelok fitting is installed on the end of the penetration tube or an end of the guide tube.

5. The sealing mechanism of claim 1,
   wherein the thimble comprises a thimble protrusion between the first end portion and the middle portion of the penetration tube or between the second end portion and the middle portion of the penetration tube.

\* \* \* \* \*